United States Patent [19]
Godin et al.

[11] 3,770,256
[45] Nov. 6, 1973

[54] APPARATUS FOR LEVELING THE DECKS OF SHIPS

[76] Inventors: Jacques J. Godin, Triel-sur-Seine; Jacques A. Stephan, Loire-Atlantique, both of France

[22] Filed: May 24, 1972

[21] Appl. No.: 256,244

Related U.S. Application Data

[62] Division of Ser. No. 883,720, Dec. 10, 1969, abandoned.

[30] Foreign Application Priority Data

Dec. 20, 1968 France .............................. 68179430

[52] U.S. Cl. .................. 266/4 F, 72/342, 148/130, 148/151, 266/4 S, 266/23 K, 266/23 M
[51] Int. Cl. ............................................. C21d 7/14
[58] Field of Search ...................... 266/4 R, 4 F, 4 S, 266/8 R, 23 C, 23 H, 23 K, 23 L, 23 M; 72/342; 148/130, 151

[56] References Cited
UNITED STATES PATENTS

| | | | |
|---|---|---|---|
| 2,480,287 | 8/1949 | Crowe ............................ | 266/4 F X |
| 2,428,825 | 10/1947 | Arnoldy .......................... | 148/151 X |
| 2,206,969 | 7/1940 | McNutt ........................... | 266/23 M |
| 2,208,121 | 7/1940 | Davis .............................. | 266/4 F X |
| 2,254,307 | 9/1941 | Mott et al ....................... | 266/4 F X |

Primary Examiner—Andrew R. Juhasz
Assistant Examiner—James F. Coan
Attorney—Sughrue, Rothwell, Mion, Zinn & Macpeak

[57] ABSTRACT

This invention concerns a method of levelling the decks of ships and other large surfaces of metal sheeting by a succession of heating and cooling processes, as also an apparatus for carrying out the method.

3 Claims, 2 Drawing Figures

PATENTED NOV 6 1973 3,770,256
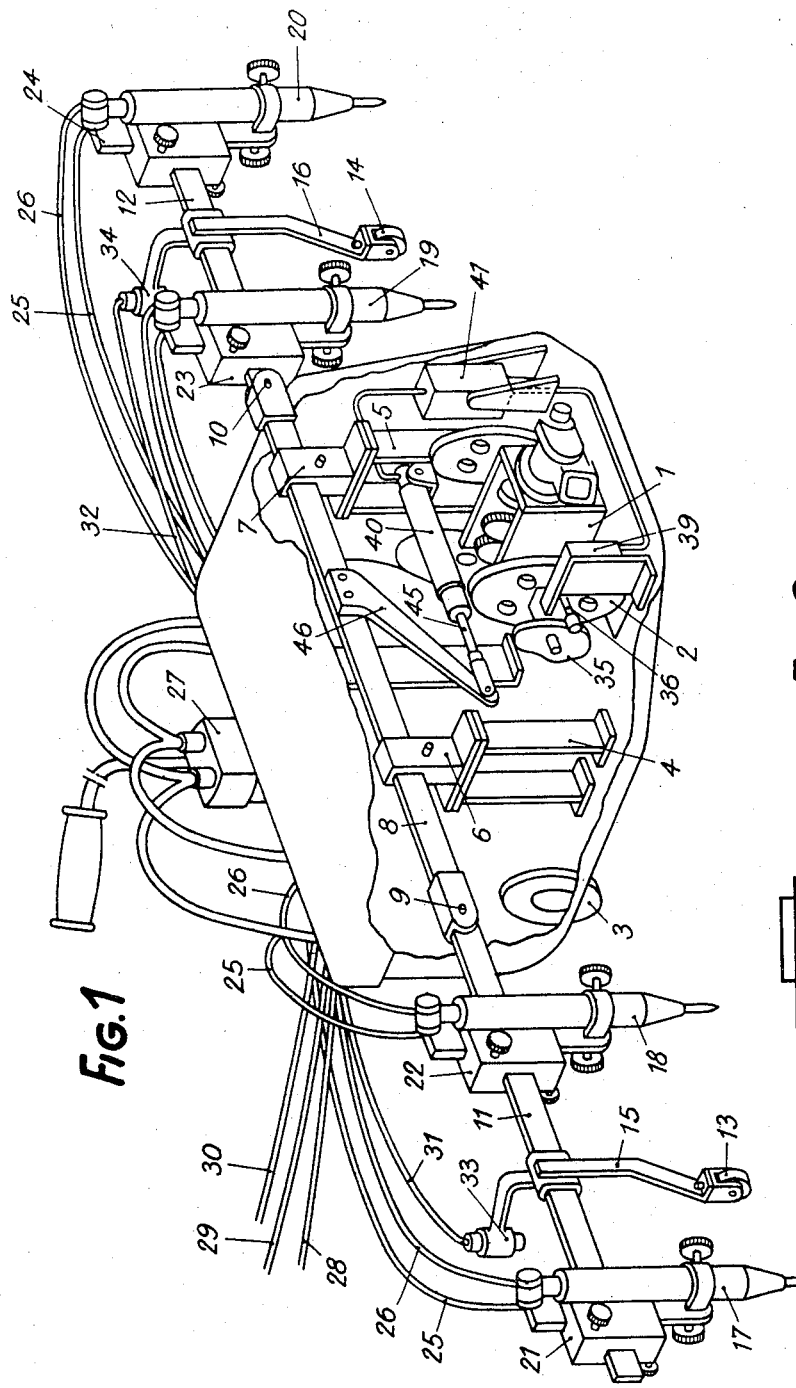
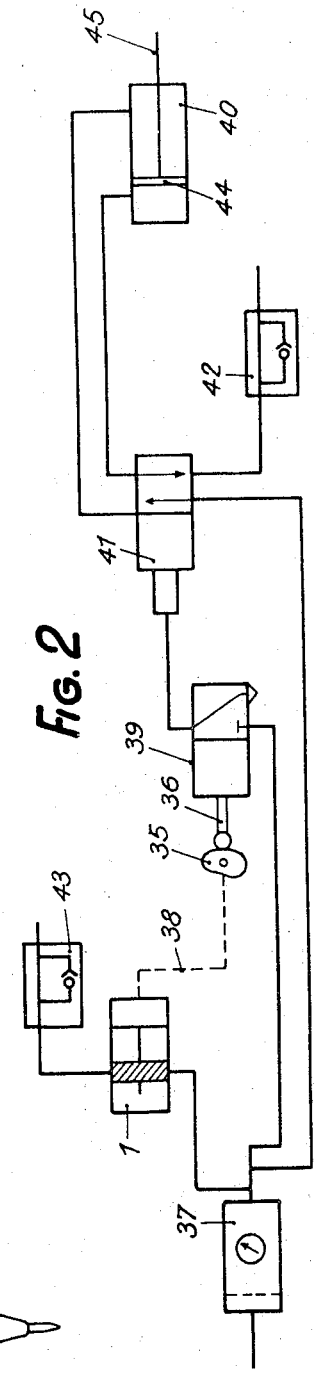

APPARATUS FOR LEVELING THE DECKS OF SHIPS

This is a Division of U.S. Pat. application Ser. No. 883,720, filed Dec. 10, 1969, now abandoned in favor of continuation U.S. Pat. application Ser. No. 273,907 filed July 21, 1972.

It is known that the modern method of constructing ships uses construction techniques involving the welding of metal plates. However, despite precautions that have been taken, the plates sometimes become deformed. Thus, the secondary decks, principally in superstructures, tend, after welding to the side and, particularly as the loading of the ship increases in the course of its armament to become deformed. The deck then presents waves or pockets of metal between stiffening members, frequently amounting to rises of 20 – 30 mm between frames.

The conventional method of levelling consists in shrinking the excess metal so as to return the initial rise to admissible values, that is to say, 4 – 7 mm between the frames. This result is obtained by the hot shrinkage method, consisting in heating the plate locally to about 900° C, then suddenly chilling it.

A series of successive local heating operations of 8–10 cm in length then follow, with a spaced interval of 10 cm between them, parallel to the deck stiffening members, commencing at 10 cm therefrom, starting from the axis of the ship towards the side and progressively approaching the following stiffener. The heating operations are spaced quincuncially, that is to say, four at the corners and one in the middle, in order to avoid cracking or fracture of the plate.

Since the hatch from which one is operating is bordered on all sides by welding seams connecting it to the hull, partitions and other areas of deck, the shrinkage results in subjecting to tension the plates constituting the deck assembly, with the effect of stretching them and, consequently, reducing deformations in the forms of waves or pockets.

These operations are long and difficult, owing to the necessary labour involved and do not give a result equal to that which might be expected theoretically.

The method of the present invention makes it possible to achieve a considerable reduction of deformations, no longer by only treating the deformed parts until the existing rises disappear which in the end are only partially reduced, but by proceding with rapid heat shrinkage operations effected simultaneously over a large area.

The method of the present invention is characterised by the feature that, in the course of an initial phase, an assembly of areas is treated simultaneously by heating operations between 850° and 950° simultaneously, the heating operations being followed by a sudden chilling operation taking place within a time lapse of only a few seconds. This initial phase may be followed, after a resting phase of 1 – 3 hours, by a third phase, identical to the first, when the deforming rise is more than 20 mm.

Such a method cannot be effected manually, even with labour trained to carry out levelling operations by heat treatments. Indeed, it is known that, in order to be efficient, the heating treatments must be fairly close together, with a spacing of the order of about 10 cm and be disposed quincuncially in such manner as to avoid cracking or fracturing the metal plate. The result is that such operations can not be carried out simultaneously by workmen normally provided with only one blowpipe. Furthermore, despite their skill, the workmen cannot achieve the rapid chilling required by the method of the present invention which must take place a few seconds at the most after the plate has reached a temperature between 850° and 950°.

Another object of the invention therefore resides in an automatic levelling apparatus characterised in that it comprises a frame, a support mounted on the frame, an assembly of blowpipes and water atomisers mounted on the said support, tubes to feed the blowpipes and atomisers, is also a motor and wheels mounted on the frame for moving the apparatus over the plates.

Such an apparatus makes it possible both to obtain an assembly of simultaneous heating operations and sudden chilling operations following the heating operations with any desired short interval of time.

Another object of the present invention concerns an apparatus of this type in which the support of the blowpipes and atomisers is displaceable in a direction perpendicular to the displacement of the apparatus, a cam turning synchronously with the displacement of the apparatus to control at regular intervals the displacement of the said support in one direction, then its displacement after a further interval in the opposite direction.

The advantage of such a device is that the length of the heating operations can be limited to 10 cm so as to avoid the effect of cracking due to very long heating operations in a straight line, whilst avoiding the extinction and re-lighting of the blowpipes.

For this purpose, the lateral displacement is effected very rapidly so that the portion of the plate swept over in this movement is heated only to a negligible extent and so that at the end of the transverse movement, the blowpipes recommence heating operations of 10 cm located quincuncially relatively to the preceding operations in lines parallel to the displacement of the apparatus.

In order that the invention may be readily carried into practice, one embodiment will now be described in detail, by way of example, with reference to the accompanying drawings, in which:

FIG. 1 is a perspective schematic view of the embodiment, selected by way of example, of the apparatus of the present invention;

FIG. 2 is a basic diagram showing the operation of the controls of the apparatus.

With reference to FIG. 1, the frame of the apparatus, the side portions and the cover of which are assumed to be partially broken away, supports a motor 1, driving wheels 2 actuated by the said motor 1, loose wheels 3 and two supports 4 and 5, the upper ends 6 and 7 of which comprise in each case a roller on which a bar 8 rests. Pivoted on said bar, about axes 9 and 10, are disposed two arms 11 and 12 resting on the plates to be levelled by rollers 13, 14 pivoting about a vertical axis mounted near the end of supports 15 and 16 fixed to the arms. This particular arrangement enables the arms 11 and 12 to be kept at a given level above the surface, whatever the deformations of the plates may be between the rollers 13 and 14 and, consequently, to keep the flames of the blowpipes 17, 18, 19 and 20, carried by the arms, at a given distance from the plates. The adjustment of this distance is effected by sliding supports 21 – 24 of the blowpipes.

Ducts such as 25 and 26 feed the combustion supporting gasses and fuels to each blowpipe. They are connected to a distributor 27 receiving these fluids through two ducts 28 and 29.

A duct 30 supplies cooling water to secondary ducts 31 and 32 feeding atomisers 33 and 34 located behind the arms 11 and 12.

The distance between the alignment of blowpipes and the alignment of atomisers is of the same order of magnitude as the length of the portion of the plate of sheet metal heated before passing to the following position; this distance may be different from this length. The atomisers may be of any type and, in particular, comprise a compressed air jet so as to spread a veritable mist over the area concerned. Continuous efficient cooling may thus be readily obtained as soon as desired after the ceasing of the heating process.

A cam 35, driven by the motor 1, actuates by way of a roller 36 a pilot valve 39 controlling, through the intermediary of a piloted valve 41, the lateral displacement of the bar 8.

In the embodiment concerned, as driving motor, a compressed air motor has been selected, shown schematically in FIG. 2 by the rectangle 1. This motor is fed by a pneumatic feeding unit 37 and causes the rotation of the cam 35 by a device indicated schematically by the dotted line 38. In the course of its rotation the cam 35 actuates, by way of the member 36, the pilot gate valve 39 controlling the reversal of a double-action jack 40 through the intermediary of the piloted valve 41. The members 42 and 43 are conventional feed regulators and may be of any desired type. The same applies to the gate valves 39 and 41.

When the cam 35 actuates the valve 39, the latter controls the piloted valve 41, which has the effect, in the condition shown, of urging the piston 44 to the right. The piston rod 45 is also shown in FIG. 1. The end of this rod drives an extension arm 46 fixed to the bar 8.

It is obvious that this device could be quite easily replaced by an equivalent device. In particular, if an electric motor was substituted for the compressed air motor electro-valves could be employed and the control for reversing the movement of the valve 8 could still be obtained at regular intervals.

The above-described operation controlled by the valve 41 has the effect of rapidly returning the blowpipes 17 - 20 to the right side of FIG. 2 in order to effect four simultaneous heat treatments over a length of about 10 cm, for example; another control by the cam 35 causes the blowpipes to move rapidly to the left, into the position shown in FIG. 1 as soon as the preceding simultaneous heat treatments are completed.

On the asumption that the blowpipes are spaced apart from each other by 20 cm, the cam displaces the bar 8 by 10 cm in one direction, then in the other. If the movement of the frame of the apparatus is 10 cm between two successive displacements of the bar, the traces of the impacts of the flames of the blowpipes on the deck are disposed in two series of four lines, the traces in the same line being 10 cm long and separated by an unheated space of 10 cm ; in one series, the four simultaneous impacts are on the same line perpendicular to the path of the apparatus, in the other series they are at the level of the unheated spaces of the first series of lines. The width of each of the traces is of the order of a centimetre, whilst the width of the mist issuing from the atomisers such as 33, 34 is of the order of a decimetre.

Although only one embodiment of the invention has been described, it is obvious that the number of blowpipes and water atomisers could be reduced or increased without departing from the scope of the present invention, that the atomisers could be disposed on a support rigidly secured to the frame, or that circuits for controlling the gases on the blowpipes could be provided or again that the support of the blowpipe could be mounted at the front or rear of the general chasis of the apparatus.

What we claim is:

1. An apparatus for leveling metal plates by a succession of heating and certain chilling operations, comprising:
   a. a frame,
   b. a support mounted on the frame,
   c. an assembly of blowpipes and water atomisers mounted on said support,
   d. tubes for feeding said blowpipes and said water atomisers,
   e. a motor and wheels mounted on the frame to move the apparatus over the metal plates,
   f. wherein the support of the blowpipes and water atomisers is displaceable in a direction perpendicular to the displacement of the apparatus, and
   g. a cam rotating synchronously with the displacement of the apparatus in a longitudinal direction, and adapted for controlling at regular intervals the displacement of said support in said perpendicular direction, said perpendicular displacement taking place first in one direction, then, after a predetermined interval, in the opposite direction, the apparatus thus executing quincuncial heat treatments.

2. An apparatus as claimed in claim 1, wherein the support of the blowpipes and atomisers comprises arms pivotably connected to a member adapted for sliding relatively to the frame and carrying the blowpipes and the atomisers, the arms being provided with abutments, including rollers having a pivoting rolling axis, and resting on the surface to be treated.

3. An apparatus as claimed in claim 2, wherein the position of the blowpipes on said support is adjustable so that the trace of the flames of the blowpipes on the metal plate is disposed at any moment externally of the path of the driving wheels of the apparatus.

* * * * *

UNITED STATES PATENT OFFICE
CERTIFICATE OF CORRECTION

Patent No. 3,770,256  Dated November 6, 1973

Inventor(s) Jacques J. GODIN et al

It is certified that error appears in the above-identified patent and that said Letters Patent are hereby corrected as shown below:

In the Heading:

Assignee's name omitted. Insert the following:
-- L'Air Liquide, Societe Anonyme Pour L'Etude et L'Exploitation Des Procedes Georges Claude --

ABSTRACT - Delete "This invention concerns...carrying out the method." and substitute the following:
-- An apparatus for leveling buckled deck plates on ships which employs a motor driven carriage which is moved across a deck plate and carries a transverse arm on which blow pipes for heating the plate are disposed. Atomizer nozzles are disposed on the arm between and behind the blow pipes. Cam control means are provided for axially shifting the arm at predetermined intervals whereby the linear areas heated by the blow pipes are thereafter rapidly cooled by the atomizer sprays to shrink the plate and restore a level surface. --

Column 1, between lines 4 and 5, insert the following paragraph:

-- This invention concerns a method of levelling the decks of ships and other large surfaces of metal sheeting by a succession of heating and cooling processes, as also an apparatus for carrying out the method. --

Signed and sealed this 23rd day of April 1974.

(SEAL)
Attest:

EDWARD M.FLETCHER,JR.
Attesting Officer

C. MARSHALL DANN
Commissioner of Patents